Sept. 19, 1967     C. A. ANDERSON     3,342,977
ELECTRIC BROILER HEATING ELEMENT
Filed Nov. 2, 1964

INVENTORS
CLARENCE A. ANDERSON
BY
ATTORNEYS

United States Patent Office 3,342,977
Patented Sept. 19, 1967

3,342,977
ELECTRIC BROILER HEATING ELEMENT
Clarence A. Anderson, Dearborn, Mich., assignor to The Detroit Edison Company, Detroit, Mich., a corporation of New York
Filed Nov. 2, 1964, Ser. No. 408,078
3 Claims. (Cl. 219—548)

The invention relates to broilers and refers more specifically to broiler heating element structure for electric broilers or the like constructed to improve the uniformity of heat provided thereby and the strength thereof.

In the past broilers have been deficient in maintaining a uniform heat over the entire area covered thereby. Heating is usually accomplished most readily in the center of the area in which cooking is done while near the edges of the cooking surface less heating has been accomplished.

In addition to the problem of uniform heating, broilers have in the past often been deficient in that where sheets of high resistance metal have been used for the heating elements the heating elements have not been sufficiently rigid to span large heating areas. Wherein prior broiler heating elements have not been subject to the indicated deficiencies, they have been complicated or difficult to manufacture and consequently too expensive for many applications.

It is, therefore, one of the objects of the present invention to provide improved broiler heating element structure.

Another object is to provide broiler heating element structure constructed and arranged to provide substantially uniform heat over the entire cooking surface covered thereby.

Another object is to provide broiler heating element structure having longitudinally extending corrugations for controlling the heat pattern thereof and for providing stiffness or strength therefor.

Another object is to provide broiler heating element structure constructed and arranged to provide maximum strength with a minimum of material.

Another object is to provide broiler heating element structure comprising a heating element of corrugated, high resistance sheet metal in the form of an arch in longitudinal cross section and in which the corrugations run longitudinally of the heating element and are deeper and closer together at the sides and supporting members for the heating element connected to the ends thereof.

Another object is to provide broiler heating element structure as set forth above wherein one supporting member and the heating element are cut in two centrally and longitudinally of the heating element.

Another object is to provide broiler heating element structure which is simple in construction, economical to manufacture, and efficient in use.

Other objects and features of the invention will become apparent as the description proceeds, especially when taken in conjunction with the accompanying drawings, illustrating a preferred embodiment of the invention, wherein.

Figure 1:
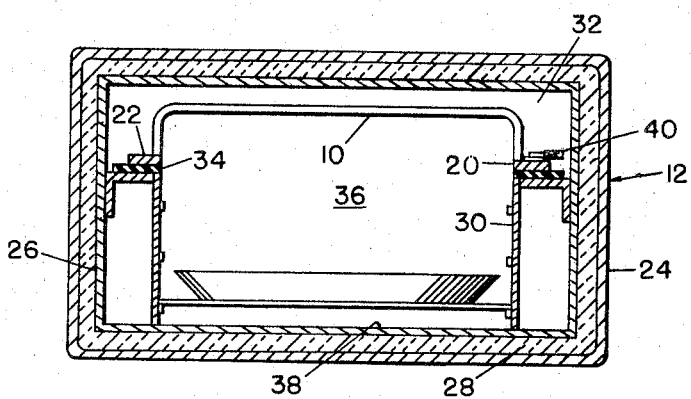
FIGURE 1 is a section view of a broiler including electric broiler heating element structure constructed in accordance with the invention.

With particular reference to the figures of the drawing, one embodiment of the present invention will now be considered in detail.

Figure 2:
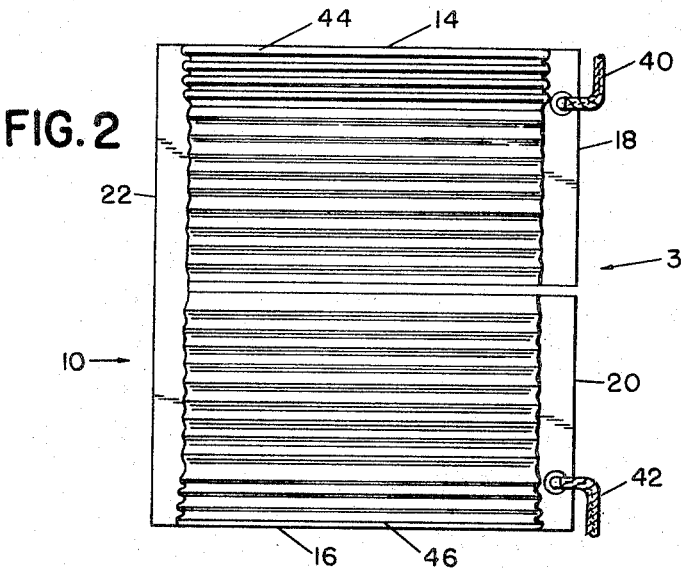
FIGURE 2 is a top plan view of the broiler heating element structure illustrated in FIGURE 1.

The broiler heating element structure 10 of the invention is illustrated in broiler structure 12 in FIGURE 1. As best shown in FIGURE 2, the broiler heating element structure 10 includes a pair of corrugated heating element sheets 14 and 16 of high resistance metal having the shape of an arch in longitudinal cross section as illustrated best in FIGURE 4. The electric bar terminal supporting members 18 and 20 are connected to the corrugated sheets 14 and 16 at the one end thereof while the electric bar terminal supporting member 22 is connected to the other end of the corrugated sheets 14 and 16 as shown best in FIGURE 2.

Figure 4:
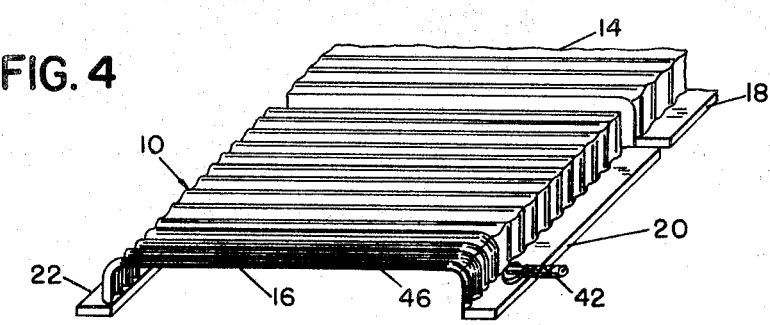
FIGURE 4 is a perspective view of the heating element structure illustrated in FIGURES 1 through 3.

The corrugations of the heating element sheets 14 and 16 extend longitudinally thereof as shown best in FIGURES 2 and 4 to provide strength for the heating element sheets. The corrugations are further spaced closer together and are deeper at the sides of the heating element sheets at the front and back of the broiler structure 12 to provide more uniform heating over the area covered by the heating element structure 10.

More specifically, the broiler structure 12 includes outer and inner housing elements 24 and 26 respectively separated by heat insulation 28. Broiler lining and heating element supporting brackets 30 are secured to the inner housing member 26 and extend from the back 32 of the broiler structure 12 to the front of the broiler adjacent the door (not shown) thereof.

The broiler heating element structure 10 is secured to the brackets 30 by convenient means (not shown) and is electrically insulated therefrom by the strips of electric insulation 34. Thus a broiler chamber 36 is defined between the brackets 30, the bottom 38 of the inner housing 26 and the broiler heating element 10, together with the back 32 of the inner housing 26 and the previously mentioned but not shown broiler door.

Figure 3:
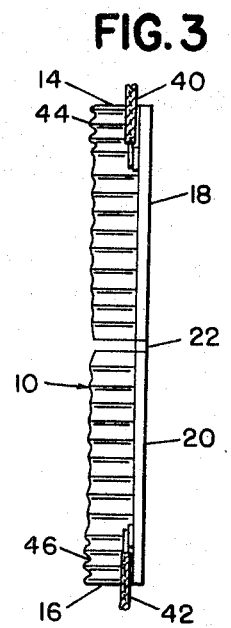
FIGURE 3 is an end elevation of the broiler heating element structure illustrated in FIGURE 2 taken in the direction of arrow 3 in FIGURE 2.

The broiler heating element structure 10 is best shown in FIGURES 2–4, and as indicated above comprises a pair of heating elements 14 and 16 which are in the form of an arch in longitudinal cross section. The heating elements 14 and 16 are connected along one end thereof by the electric bar terminal supporting member 22 and are secured at the other end to the electric bar terminal supporting members 18 and 20 respectively.

As shown the heating elements 14 and 16 and the electric bar terminals 18 and 20 are positioned in transverse spaced apart relation. The electric bar terminals 18 and 20 are connected to the electric conductors 40 and 42 which in turn may be connected to the opposite terminals of a source of low voltage high current electricity (not shown).

With the heating elements 14 and 16 positioned in transversely spaced apart relation and connected together through electric bar terminal 22, the electric current through the heating elements 14 and 16 is forced to travel a longer path than it would if the heating elements 14 and 16 and the electric bar terminals 18 and 20 were single members. The efficiency of heating is thus improved.

Uniform heat is provided over the entire area of the heating elements 14 and 16. Thus the side 44 of the heating element 14 and the side 46 of the heating element 16 have corrugations which are spaced closer together and are deeper to provide a greater heating element area and thus provide more heat at these sides.

The other sides of the heating elements 14 and 16 and the central portion thereof provide substantially the same heating since the area beneath the heating elements under these parts thereof receive radiation from two sides rather than a single side as at the sides 44 and 46. The ends of the heating element are provided with additional heat to compensate for the single sided radiation at the ends by the turning down of the ends of the heating elements 14 and 16.

Added strength is also provided for heating element structure 10 by the turning down of the ends of the heating elements 14 and 16 to form a longitudinal cross section of heating elements 14 and 16 in the shape of an arch. Additional strength is also provided for the heating element structure 10 on placing the corrugations in the heating elements 14 and 16 to extend longitudinally of the elements and supporting the heating elements at the ends thereof.

In one particular application, the heating elements 14 and 16 have been approximately 24 inches long or from 26 to 28 inches long counting the turned down ends thereof and 12 inches wide. The heating elements 14 and 16 have been formed of an 80–20 nickel chrome alloy approximately 20 mils thick so that of 12 kilowatts delivered to the heating element, sixty percent of this power is radiated from the heating element to the cooking surface on placing 9.3 volts at 1290 amperes across the conductors 40 and 42. With such structure the corrugations in the first two inches of the sides 44 and 46 of the heating elements 14 and 16 have been increased in depth and decreased in spacing.

While one embodiment of the invention has been disclosed in detail, it will be understood that other embodiments and modifications thereof are contemplated. It is the intention to include all embodiments and modifications of the invention as are defined by the appended claims within the scope of the invention.

What I claim as my invention is:

1. A heating element for a broiler or the like comprising an elongated corrugated sheet of high resistance metal in which the corrugations extend longitudinally thereof, the central portion of which extends substantially horizontally and the ends of which are turned down to extend substantially vertically whereby the corrugated sheet forms an arch, separate substantially flat electric bar terminals extending transversely of the corrugated sheet secured to the opposite ends of the corrugated sheet along one edge of the electric bar terminals and extending horizontally outwardly from the ends of the corrugated sheet and means for connecting the bar terminals at the opposite ends of the heating element to a source of electric energy.

2. Structure as set forth in claim 1 wherein the corrugations in the corrugated sheet of high resistance metal are deeper and closer together at at least one side of the corrugated sheet.

3. A heating element for a broiler or the like comprising a pair of elongated corrugated sheets of high resistance metal in which the corrugations extend longitudinally of the sheets positioned side by side in spaced apart relation in the same plane, the central portions of which extend substantially horizontally and the ends of which are turned down to extend substantially vertically whereby the corrugated sheets form arches, a first substantially flat electric bar terminal secured to the same one end of each of the corrugated sheets along one edge of the electric bar terminal, and extending horizontally outwardly from the one end of the corrugated sheets, separate electric bar terminals secured to the other end of each of the corrugated sheets secured thereto along one edge thereof and extending horizontally outwardly from the other end thereof and means for connecting a source of electric energy to the said separate electric bar terminals.

References Cited
UNITED STATES PATENTS

| | | | |
|---|---|---|---|
| 1,890,339 | 12/1932 | Romhild | 313—341 X |
| 2,809,223 | 10/1957 | Stevenson | 13—25 |
| 2,891,303 | 6/1959 | Stevenson | 29—183 |
| 2,896,004 | 7/1959 | Duffy et al. | 13—22 |
| 3,057,936 | 10/1962 | Hill | 13—25 |
| 3,086,187 | 4/1963 | Duggan et al. | 338—283 |
| 3,100,711 | 8/1963 | Eisler | 219—528 X |

FOREIGN PATENTS 1,323,543  3/1963  France.

RICHARD M. WOOD, *Primary Examiner.*

V. Y. MAYEWSKY, *Assistant Examiner.*